United States Patent
Carlson et al.

(10) Patent No.: US 8,352,368 B2
(45) Date of Patent: Jan. 8, 2013

(54) P2P TRANSFER USING PREPAID CARD

(75) Inventors: Mark Carlson, Half Moon Bay, CA (US); Surendra Keshan, Cupertino, CA (US)

(73) Assignee: Visa International Service Association, San Francisco, CA (US)

( * ) Notice: Subject to any disclaimer, the term of this patent is extended or adjusted under 35 U.S.C. 154(b) by 441 days.

(21) Appl. No.: 12/425,295

(22) Filed: Apr. 16, 2009

(65) Prior Publication Data

US 2010/0094753 A1  Apr. 15, 2010

Related U.S. Application Data

(60) Provisional application No. 61/105,001, filed on Oct. 13, 2008.

(51) Int. Cl.
*G06Q 40/00* (2012.01)
(52) U.S. Cl. ......................................................... 705/41
(58) Field of Classification Search ................ 705/35–45
See application file for complete search history.

(56) References Cited

U.S. PATENT DOCUMENTS

| | | | |
|---|---|---|---|
| 7,003,493 B2 | 2/2006 | Weichert et al. | |
| 2004/0139019 A1* | 7/2004 | Cooper | 705/44 |
| 2008/0097905 A1 | 4/2008 | Neofytides et al. | |
| 2008/0172331 A1 | 7/2008 | Graves et al. | |
| 2009/0106152 A1* | 4/2009 | Dill et al. | 705/44 |
| 2010/0280948 A1* | 11/2010 | Cohen | 705/42 |

FOREIGN PATENT DOCUMENTS

| | | |
|---|---|---|
| KR | 10-2000-0037389 A | 7/2000 |
| KR | 10-2001-0008292 A | 2/2001 |

OTHER PUBLICATIONS

Search/Examination Report dated May 24, 2010 from International Application No. PCT/US2009/060116, 13 pages.

* cited by examiner

*Primary Examiner* — Thomas M Hammond, III
(74) *Attorney, Agent, or Firm* — Kilpatrick Townsend & Stockton LLP (57) ABSTRACT

A method and system for making a payment is disclosed. In the method, a Payor can specify an account from which to withdraw funds for the payment and specify an activation code necessary to activate the payment. The payment can be sent to a Payee in the form of a pre-paid transaction account. The account will not be activated unless the Payee provides the activation code. Funds can be withdrawn from the account specified by the Payor either in full at the time the payment is made or are withdrawn as the Payee uses the transaction account to access the funds.

21 Claims, 5 Drawing Sheets

Registration

- 302 — Choose User ID: User A
- 304 — Choose Password: ******

Send Payment

- 322 — Send Payment To: User B
- 324 — E-Mail Address: UserB@email.com
- 326 — Address: 1 Main Street Anywhere, USA
- 328 — Amount: 100.00
- 330 — Card Issue: ● Physical   ○ Virtual
- 332 — Funding Type: ○ Immediate   ● As Used
- 334 — Funding Account: 99999999
- 336 — Activation Code: *******

P2P TRANSFER USING PREPAID CARD

CROSS REFERENCES TO RELATED APPLICATIONS

This application is a non-provisional of and claims the benefit of U.S. Patent Application No. 61/105,001 filed on Oct. 13, 2008. This application is herein incorporated by reference in its entirety for all purposes.

BACKGROUND

There are many situations in which a person or entity ("Payor") wishes to transfer money to another person or entity ("Payee"). In the simplest situation, the Payor may physically hand the Payee cash or a check. In other situations, the Payor may mail the Payee cash or a check. Transactions such as these have most likely been occurring since the advent of the modern financial infrastructure, if not earlier. Such transactions still have numerous shortcomings.

First, a Payor typically transfers funds to a Payee for a reason, such as to purchase goods or services. Payment can either be made before or after the goods or services are delivered, each method having its own disadvantages. When goods or services are provided before payment, the Payee must rely on faith that the Payor has sufficient funds to pay and that the Payor will actually complete the payment after the goods or service is delivered. In the opposite case, when payment is made before the goods or services are delivered, the Payor must rely on faith that the Payee will actually provide those goods or services. Typically, once the payment has left the control of the Payor, he has little recourse if the Payee does not perform his obligations. Although there are numerous post transaction processes, such as stopping payment on a check or resorting to the courts, to resolve problems that may arise, these solutions can create a large burden for both the Payor and the Payee.

A second shortcoming that may arise from a Payor providing funds to a Payee directly is that typically the Payor will need to fully posses the funds necessary to make the payment. In many cases, the Payor may not have sufficient funds or credit to make the payment, but may have access to a line of credit, such as a credit card, from which to draw funds. However, most individuals receiving payment will not have the necessary infrastructure to accept a credit card payment. Even in the case where it can be arranged for the Payee to receive funds that are drawn from a line of credit, there is still a disadvantage to the Payor. When making payments using a credit card, an amount is debited to the Payee's account at the time the transaction is processed. In most cases this may cause the Payor to begin to accrue interest charges for the withdrawn funds for the full amount from the time the transaction is entered. The interest accrues despite the fact that the Payee may not use the funds for an indefinite period of time or, in some exceptional cases, may not use the funds at all.

A third shortcoming of providing payment directly to a Payee arises when the payment is sent through a facility such as the US Postal Service. Although it is possible to send cash through the US Postal Service, it is almost universally recognized that this is not a prudent practice. The preferred method of sending a payment through the mail is through some form of written instrument, such as a check or money order. However, this fails to take into account that a significant portion of the population is unbanked, that is to say they have no relation with the formal banking system. An unbanked recipient of a written instrument, such as a check, may be forced to utilize a check cashing service in order to receive his funds. These services will typically charge a fee, either as a flat rate or a percentage of the transaction, in order to cash the written instrument. As such, the amount received by the Payee will be reduced by these fees.

There have been attempts made at solving the above mentioned problems. One example of such an attempt is the system offered by PayPal™. That system allows a Payor to send a payment to any Payee that has an e-mail address and to use a credit card to fund the payment. This still does not resolve the above mentioned problems. Specifically, once the payment is sent, the Payor loses control over the transaction completely. Secondly, although a credit card may be used to fund the transaction, the full amount of the transferred funds is charged immediately. Finally, the PayPal™ system requires the Payee to register with the system in order to receive funds. Typically, the registration involves providing bank account information, which is not possible in the case of the unbanked. Although the system has the option of mailing a physical check to the Payee, this still does not resolve the problem with respect to the unbanked.

Embodiments of this disclosure address these and other problems individually and collectively.

BRIEF SUMMARY

A system that allows a Payor to send a payment to a Payee would be desirable. Such a system would desirably allow the Payor to request that a pre-paid, but initially inactive, transaction account identifier be sent to the Payee. The system would desirably allow the code necessary to activate the pre-paid transaction account to be sent from the Payor directly to the Payee. The system would also desirably allow the Payor to fund the pre-paid card using a transaction account, such as a credit card account. Furthermore, the system would desirably allow the Payor to fund the pre-paid transaction account as the funds are used by the Payee, instead of at the time of the initial payment.

Embodiments of the present disclosure pertain to methods and systems for allowing a user to make a payment to another user. The payment may be sent in a form that is initially inactive. Funds for the payment may be withdrawn from the account of the paying user as they are used by the recipient of the payment.

In one embodiment of the invention, a method of transferring funds is described. The method includes receiving from a first user a request to transfer funds to a second user. The request can include contact information for the second user. The request can further include a first activation code and an amount to transfer. The request can also include a first account identifier which identifies a first account to be used as the source of the transferred funds. The method can further include creating a second account which has a second account identifier. The second account may initially be in an inactive state. The method can further include funding the second account with funds from the first account. Additionally, the method can include sending the second account identifier to the second user by using the contact information. The method can further include receiving a second activation code from the second user. The method can additionally include activating the second account if the first and second activation codes are the same.

In another embodiment, a method performed by a first user using a first access device is described. The method can include sending a payment request to a payment processing network. The payment request can include the contact information for a second user. The payment request can also include a first activation code and an amount to transfer. The payment request can also include a first account identifier indicating a first account to be used as the source of the transferred funds. The request can be sent to a payment processing network that may be configured to create a second account having a second account identifier. The second account can be created in an initially inactive state. The payment processing network can further fund the second account with funds from the first account. The payment processing network can also send the second account identifier to the second user by using the second user's contact information. The payment processing network may further receive a second activation code from the second user. The payment processing network may activate the second account if the first and second activation codes are the same. The method also includes the first user communicating the first activation code to the second user.

Another embodiment of the invention is directed to an access device comprising: a processor; and a computer readable medium coupled to the processor, the computer readable medium comprising: code for sending a payment request to a payment processing network, wherein the request includes contact information for a second user, a first activation code, an amount to transfer, and a first account identifier indicating a first account to be used as the source of the transferred funds wherein the payment processing network is configured to: create a second account having a second account identifier wherein the second account is not initially activated; fund the second account with funds from the first account; send the second account identifier to the second user using the contact information; receive a second activation code from the second user; and activate the second account if the first activation code is the same as the second activation code; and code for communicating the first activation code to the second user.

These and other embodiments of the invention are described in detail below.

BRIEF DESCRIPTION OF THE DRAWINGS

The disclosure, together with further advantages thereof, may best be understood by reference to the following description taken in conjunction with the accompanying drawings in which:

FIG. 3(A-D) depict exemplary screen shots according to one embodiment of the system of the present disclosure.

DETAILED DESCRIPTION

Embodiments of the present disclosure pertain to methods and systems for allowing a user to make a payment to another user. The payment may be sent in a form that is initially inactive. Funds for the payment may be withdrawn from the account of the paying user as they are used by the recipient of the payment.

In certain embodiments of the present invention, a user ("Payor") may wish to send a payment to another user ("Payee"). The Payor may wish to fund the payment to the Payee from an account provided by an account issuer. As used herein, funding a payment may include an actual transfer of money from an account such as a debit card account, or may include a charge to an account such as a credit card account. Funding a payment can also include reserving the funds in the account without actually performing a transfer of funds or a charge to the account. There are many different types of accounts that can be issued, such as credit card accounts, debit card accounts, pre-paid card accounts, and gift card accounts. Generically, these accounts may be referred to as transaction accounts, because they will typically provide the Payor with the ability to use the account to engage in financial transactions. This is generally accomplished through the issuance of a transaction card or other type of portable consumer device that is associated with the transaction account. Portable consumer devices can take many forms, including plastic cards with a magnetic stripe, smartcards, elements embedded in cellular phones, secure tokens, or any other suitable form. In other situations, the Payor may only have an account number which identifies the transaction account and can be used to perform transactions.

In many cases, the Payor may have multiple transaction accounts that have been issued by multiple issuers. An issuer can be a financial institution, such as a bank, that creates and maintains financial accounts. Other types of issuers can be entities such as retailers, fuel companies, etc. In some embodiments, the Payor may register with the system and specify a transaction account to use for payments. In other embodiments, the Payor may specify the transaction account to use for payment on a per transaction basis. Furthermore, the Payor may choose the amount of the payment to be made and how the funds for the payment can be withdrawn. In one embodiment, funds for the payment are withdrawn from the transaction account in the full amount of the payment at the time the payment is made. In other embodiments, funds are not withdrawn from the transaction account until they are actually used by the Payee.

In some embodiments of the present invention, the Payor may specify contact information for the Payee, such that the payment can be delivered to the Payee. In one embodiment, the contact information can include an e-mail address, such that information regarding the payment can be sent to the Payee electronically. In other embodiments, the contact information can include a physical address, such as a U.S. Postal Service address, such that information regarding the payment can be sent to the Payee in physical form. Additionally, embodiments of the present invention can allow the Payor to specify an activation code necessary to activate the payment. In some embodiments, the funds transferred by the payment are not accessible to the Payee until the payment has been activated.

In some embodiments of the present invention, the Payor can specify the form of the payment that can be sent to the Payee. In one embodiment, the payment can be sent to the Payee in the form of a funded, but not yet activated, pre-paid transaction card that is associated with a transaction account. In other embodiments, the payment can be sent to the Payee in the form of a transaction account identifier, such as an account number, of a funded, but not yet activated, pre-paid transaction account. In embodiments where a physical card is sent to the Payee, the Payee contact information can include an address for delivery of the card. In embodiments where a transaction account identifier is sent to the Payee, the contact information can either be a physical address for delivery, or an electronic address, such as an e-mail address.

In some embodiments of the invention, after the Payor has specified the transaction account to fund the payment, the amount of the payment, the contact information of the Payee, an activation code to activate the payment, and the type of payment instrument to be sent to the Payee, this information can be sent to a payment processing network. The payment processing network can determine if the Payor has sufficient funds or credit in the account specified to fund the payment. If so, in some embodiments, the payment processing network can be configured to create a pre-paid transaction account and send a transaction account identifier to the Payee. Depending on the type of payment instrument specified by the Payor, the payment processing network can either send a physical transaction card associated with the pre-paid transaction account to the Payee or can send a transaction account identifier, such as an account number, to the Payee, using the contact information provided by the Payor. In either case, the pre-paid transaction account can be funded up to the amount specified by the Payor, but can be sent in an initially inactive state. In an alternate embodiment, the transaction account identifier can be sent by the issuer of the Payor's transaction account through the payment processing network.

In some embodiments, the Payee can receive the transaction account identifier through the receipt of a physical transaction card in the mail. In other embodiments a transaction account identifier can be received in an e-mail. The transaction account can be funded up to the amount specified by the Payor. The transaction account identifier can be received in an initially inactive state. In some embodiments, the Payor and the Payee can communicate with each other to transfer the activation code. In one embodiment, the Payor may speak with the Payee to transfer the activation code. In alternate embodiments, the activation code can be communicated via an electronic communications means, such as e-mail. In embodiments of the invention, the transfer of the activation code from the Payor to the Payee occurs without interaction with the payment processing network.

In embodiments of the invention, after the Payee has received the activation code, he may communicate with the payment processing network to activate the pre-paid transaction account. In some embodiments, the activation may occur through the use of an automated voice response system. In other embodiments, the activation may occur through the use of electronic communications, such as e-mail or a web page. Any suitable form for transferring the activation code from the Payee to the payment processing network may be used with embodiments of the present invention.

In some embodiments of the invention, after the activation code is received by the payment processing network from the Payee, it can be compared with the activation code initially sent by the Payor to the payment processing network. In some embodiments, if the activation codes match, the pre-paid transaction account can be activated. Once activated, the transaction account identifier, either in the form of a transaction card or the identifier itself, such as an account number, can be used by the Payee to conduct financial transactions anywhere that transaction cards or identifiers are accepted. Typically, this can include any location where cards, such as credit and debit cards, are accepted. In addition, it can include any facility in which transaction account identifiers are accepted. One example of such a facility is transactions performed over the internet, where an account identifier is sufficient to conduct transactions. In some embodiments, the Payee may use the transaction account identifier to engage in one or more financial transactions up to the total amount of the payment from the Payor to the Payee.

In some embodiments of the invention, the funds for the payment are withdrawn in the full amount of the payment from the Payor's transaction account and deposited into the pre-paid transaction account that is sent to the Payee prior to issuing the transaction account identifier to the Payee. In alternate embodiments, funds for the payment are not withdrawn from the Payor's transaction account until they are actually used by the Payee. For example, in the case where a $100.00 payment is made to a Payee, a transaction account identifier, such as a pre-paid transaction card, with a value of $100.00 may be sent to the Payee in an initially inactive state. The funds are not immediately debited from the Payor's transaction account. After receipt and activation of the account by the Payee, the Payee may use the transaction account identifier to conduct one or more financial transactions. For example, the Payee may make a purchase valued at $25.00 using the pre-paid transaction card. At this point, funds in the amount of $25.00 may be withdrawn from the Payor's transaction account to fund the purchase. An advantageous result is that funds are not withdrawn from the Payor's transaction account until they are actually used by the Payee.

Embodiments of the present invention will now be described in detail with reference to exemplary embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

I. Exemplary Systems

Figure 1:
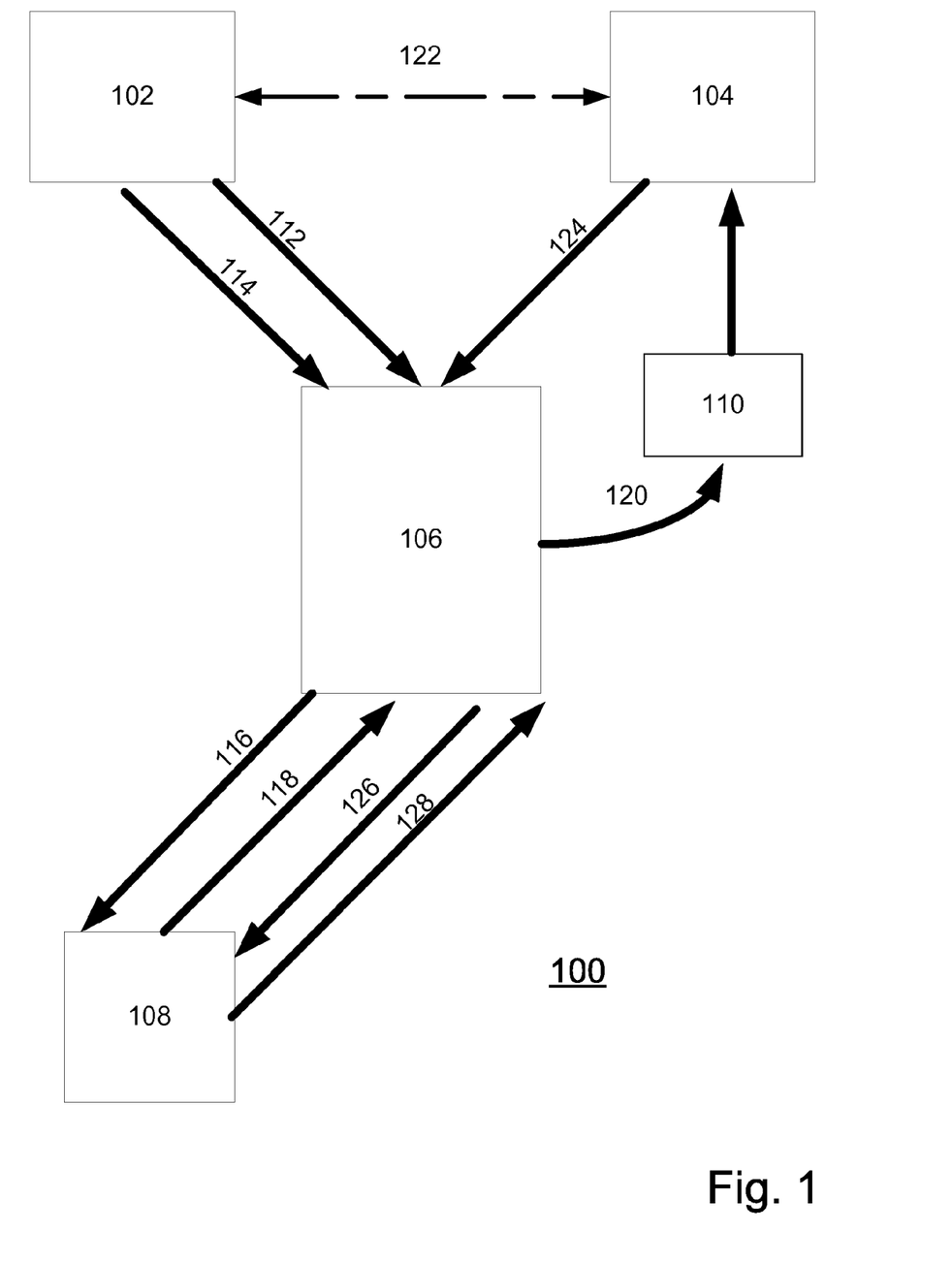
FIG. 1 is a high-level diagram illustrating one embodiment of a system in accordance with the present disclosure.

FIG. 1 is a high level diagram illustrating one embodiment of a system 100 capable of performing the disclosed method. The system 100 includes a Payor access device 102, a Payee access device 104, payment processing network 106, and an account issuer, 108. The components illustrated in FIG. 1 and recited above can be in operative communication with each other. The system 100 can further optionally include transaction card 110, issued by the issuer 108 to the user of the Payee access device 104 and associated with an account maintained by the issuer for the Payee.

The access devices 102, 104 according to embodiments of the system can be in any suitable form. Any access device that is capable of sending information to or receiving information from a payment processing network would be suitable. One exemplary access device could be a personal computer. Other examples of access devices could include cellular phones, Personal Digital Assistants (PDA), pagers, and the like. The access device may contain a computer readable medium. The computer readable medium may embody a program containing code to perform embodiments of the invention. The access device may communicate with the payment processing network through any suitable communications channel. One exemplary communications channel could be communications through the Internet. Other examples of a communications channel could include wired and wireless networks or local and wide area networks.

The payment processing network 106 may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 106 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 106 may use any suitable wired or wireless network, including the Internet.

The account issuer 108 may be any type of financial institutions, such as banks, that issue transaction accounts. Such accounts can include credit accounts, debit accounts, and banking accounts, such as checking and savings accounts. An account issued by an account issuer 108 may optionally be associated with a transaction card 110 that is issued to the user of the transaction account. Transaction cards 110 may be credit cards, debit cards, or any other type of payment card. The cards may be in any suitable form, such as a card that maintains data in a magnetic stripe on the card, a smartcard, or the like. A transaction card 110 may be issued to the users of the transaction accounts for use in performing in person transactions. However, a physical transaction card 110 is not necessary in embodiments of this system.

Although FIG. 1 depicts a single issuer 108 associated with a Payor 102 and Payee 104 with a single transaction card 110, it would be clear to a person of skill in the art that this is not limiting. A Payor 102 may have any number of transaction accounts, issued by any number of issuers, with any number of associated transaction cards. Issuer 108 may likewise issue transaction accounts to any number of users.

In order to send a payment, a Payor 102 may optionally register 112 with the payment processing network 106. The Payor 102 may use an access device such as a phone, personal computer, etc. to register 112 with the payment processing network 106. In some embodiments of the invention, the registration may allow the Payor 102 to make multiple payments without having to enter repetitive information for each transaction. In other embodiments, the Payor 102 will not register with the payment processing network 106 and will enter all required information for each payment transaction on a per transaction basis.

After the optional registration step 112, the Payor may begin a payment process transaction by sending required information 114 to the payment processing network 106. Such information can include the amount of the payment (e.g., $50.00), the account that should be used to fund the payment (e.g., the Payor's debit card account number 12345678), contact information for the Payee 104 (e.g., the Payee's phone number) the type of transaction identifier to send to the Payee 104 (e.g., a card), an activation code that is needed to activate the payment (e.g., "78951"), and if the payment should be funded immediately or as used by the Payee 104. The Payor may use an access device such as a laptop computer to send the information 114 to a server computer that is present in the payment processing network 106. The Payor may input the information into an input device such as a keyboard and this information may be manipulated by a processor in the access device and may be transmitted to the server computer in the payment processing network through a network interface.

Once the server computer in the payment processing network 106 receives the information, the server computer in the payment processing network 106 can then query 116 another computer apparatus operated by the issuer 108 of the transaction account specified by the Payor 102 to use as the source of funds for the payment. The query 116 can include the amount of the payment. A processor in the computer apparatus operated by the issuer 108 can then verify that the Payor 102 has sufficient funds or credit available in his transaction account to make the payment. In some embodiments, the computer apparatus operated by issuer 108 may respond 118 to the query by indicating that sufficient funds are available.

In other embodiments, the issuer 108 can also withdraw or otherwise debit the funds from the Payor's transaction account immediately, depending on the type of funding requested by the Payor 102.

The transaction processing network 106 in conjunction with the issuer 108 can then create a new pre-paid transaction account with an associated pre-paid transaction account identifier. This pre-paid transaction account can be funded up to the amount specified by the Payor 102 in the payment request 114. The created pre-paid transaction account identifier can then be sent 120 to the Payee 104, using the contact information received in the payment request 114. In some embodiments, the pre-paid transaction account identifier can be an account number that may be sent to the Payee 104 through an e-mail. In other embodiments, the pre-paid transaction account identifier may be a physical pre-paid transaction card 110 that is sent to the Payee 104 using any suitable facility for transferring physical cards. In some embodiments, the pre-paid transaction account identified by the transaction account identifier is initially in an inactive state.

In some embodiments, the Payor 102 and Payee 104 may then communicate 122 with each other using their respective access devices or in some other way to transfer the activation code. This communication can occur without involvement by the payment processing network 106 or the issuer 108. One exemplary means for such a communication is a telephone call. Other means can include a text message, an instant message, an e-mail, or postal mail. Any suitable form for communicating 122 the activation code between the Payor 102 and the Payee 104 can be used in embodiments of the present invention.

After receiving the activation code from the Payor 102, the Payee 104 may communicate 124 the activation code to the payment processing network 106. The Payee 104 can communicate the activation code to the payment processing network 106 using any suitable communications means. In some embodiments, the communication can occur using an automated voice response system. Other embodiments may include the use of e-mail or a web site. Once received by the payment processing network 106, the activation code can be compared with the activation code originally provided by the Payor 102. If the activation codes match, the payment processing network may activate the transaction account that has been sent to the Payee 104. The Payee 104 may then use the transaction account to conduct financial transactions until the full amount of the payment has been exhausted.

In some embodiments, the entire amount of the payment is debited (e.g., withdrawn) from the Payor's transaction account prior to sending the pre-paid transaction account identifier to the Payee 104. In other embodiments, the funds are debited from the Payor's transaction account as they are used by the Payee 104. For example, each time the Payee 104 uses the pre-paid transaction account, a notification 126 can be sent from the server computer in the payment processing network 106 to the computer apparatus of the issuer of the transaction account 108 indicating the amount of the transaction. At that point, the issuer 108 of the Payor's transaction account can debit the amount of the transaction from the Payor's transaction account and credit the amount to the Payee's pre-paid transaction account. The computer apparatus at the issuer can then respond 128 to server computer in the payment processing network 106 to indicate that the funds have been transferred. As such, funds from the Payor's transaction account are only debited (e.g., withdrawn) as they are used by the Payee 104.

II. Exemplary Methods

A. Exemplary Process Flow

Figure 2:
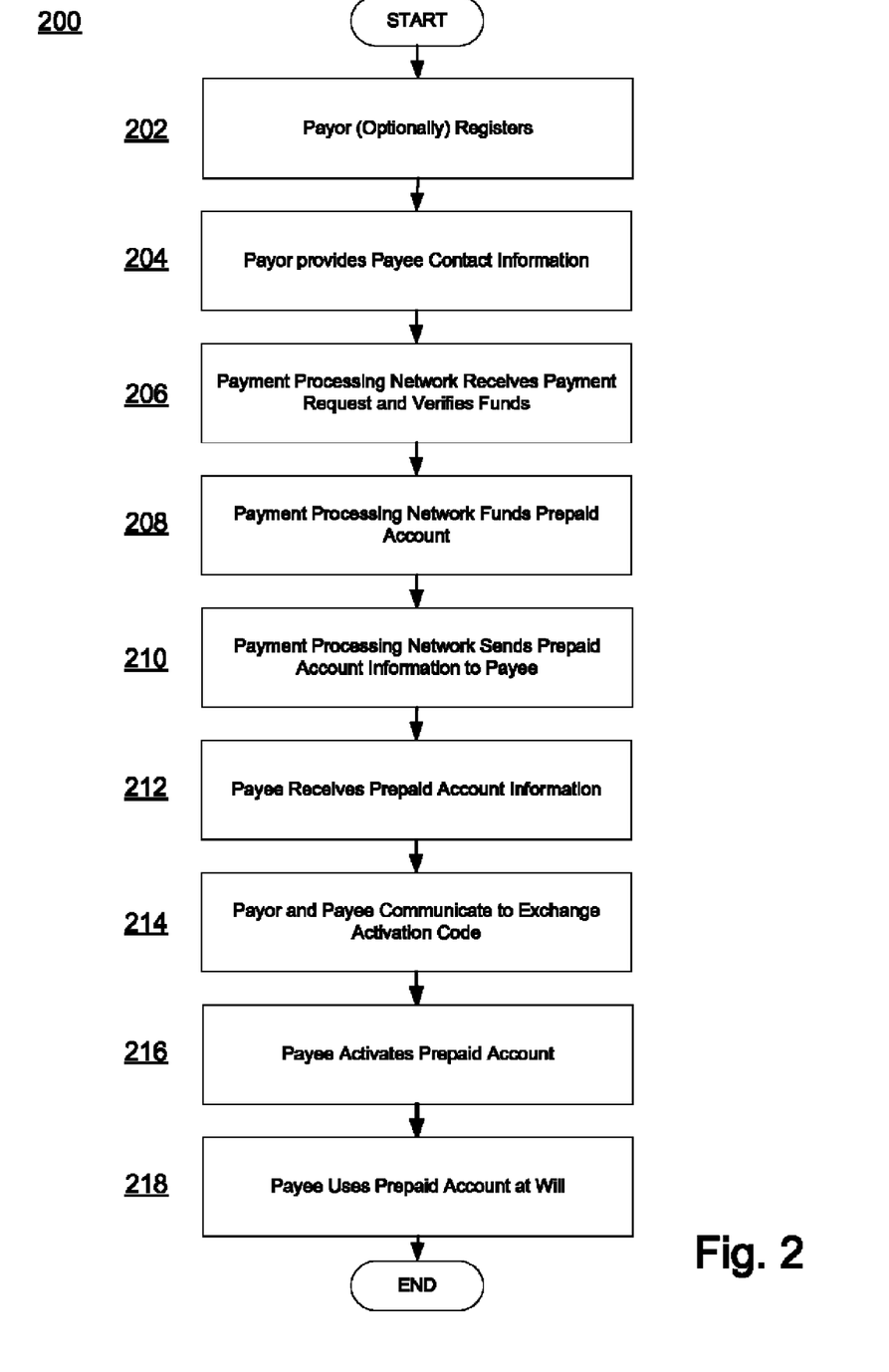
FIG. 2 is a high-level flow diagram illustrating one embodiment of a method of processing a payment transaction in accordance with the present disclosure.

FIG. 2 is a high-level flow diagram illustrating one embodiment of a method of processing a payment transaction in accordance with the present disclosure. The method 200 may begin at step 202 when a Payor optionally registers with the system. Registering with the system may allow the user to specify default information, such as an account to use for funding payment transactions. This may allow the Payor to conduct multiple transactions without having to enter the same information repeatedly. In some embodiments of the invention, this optional step can be omitted and the Payor can enter all transaction details for each transaction individually.

The method may continue at step 204 wherein the Payor can specify contact information for the Payee. In some embodiments, this contact information can be an address for receiving physical mail, while in other embodiments, the contact information can be an address for receiving electronic communications, such as an e-mail address. Any form of contact information that allows a transaction account identifier to be sent to a Payee is suitable for embodiments of the invention. The method may continue at step 206 wherein the payment processing network can receive a request to transfer funds to the Payee specified by the contact information. The request can include the amount to transfer and a transaction account to use as the source of the funds to transfer. The request can further include an indication as to the type of transaction account identifier that should be sent to the Payee. In some embodiments, the transaction account identifier may be an account number. In other embodiments, the transaction account identifier can be a physical transaction card. The request can further include an indication as to how the funds are to be debited (e.g., withdrawn) from the Payor's transaction account. In some embodiments, funds may be debited (e.g., withdrawn) in the full amount immediately. In other embodiments, funds may be debited (e.g., withdrawn) as they are used by the Payee. The request can further include an activation code that can be specified by the Payor and can be used to activate the transaction account that will be sent to the Payee. After verifying that the Payor has sufficient funds or credit in the specified transaction account, the method can continue at step 208.

At step 208 the payment processing network can create a transaction account with a transaction account identifier to be sent to the Payee. The transaction account can be a pre-paid account that has been funded from the Payor's transaction account using the method that was specified in step 206. The pre-paid transaction account that is created can initially be inactive. At step 210, the payment processing network can send the transaction account identifier as specified in step 206 to the Payee using the contact information specified in step 204. At this point, the transaction account can be funded in the amount of the payment, but is not active, and thus can not be used for transactions.

At step 212, the Payee receives the transaction account identifier. In some embodiments, the transaction account identifier is received in the form of an inactive pre-paid transaction card. In other embodiments, the transaction account identifier is received in the form of an account number associated with a transaction account. In either case, the transaction account can be funded up to the amount of the payment that is being made. At step 214, the Payor and Payee can communicate with each other to transfer the activation code. This communication can be through any suitable means. In some embodiments, the communication occurs without interaction with the payment processing network. Although in this exemplary embodiment the activation code is transferred between the Payor and Payee after the Payee receives the transaction account identifier, it should be clear that in other embodiments, the activation code can be transferred to the Payee at any point in the process.

At step 216, the Payee may activate the transaction account by communicating with the payment processing network and providing the activation code that was previously transferred in step 214. The payment processing network can compare the activation code received from the Payee with the activation code that was received from the Payor in step 206. If the two activation codes match, the payment processing network can activate the pre-paid transaction account. At step 218, the Payee can use the pre-paid transaction account to access the transferred funds anywhere that transaction accounts are accepted for payment, up to the full amount of the payment. In some embodiments, funds are only debited (e.g., withdrawn) from the Payor's transaction account as they are used by the Payee.

B. Exemplary User Interfaces

FIG. 3(A-D) depict exemplary screen shots according to one embodiment of the system of the present disclosure. FIG. 3(A) depicts an exemplary screen shot of a registration screen 300 that can allow a user to register to use the system and method, in order to send payments. The user may select a user ID 302 which can be used to identify the user to the system. The user may also select a password 304 that will allow the system and the user to ensure that only authorized users are requesting payments. Registering with the system can allow the user to send multiple payments without having to enter information repetitively.

Figure 3A:
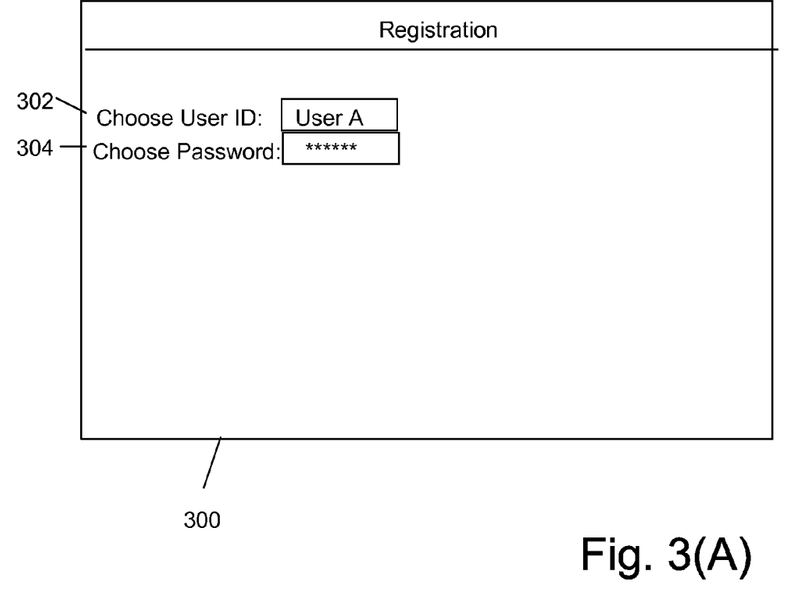
Figure 3B:
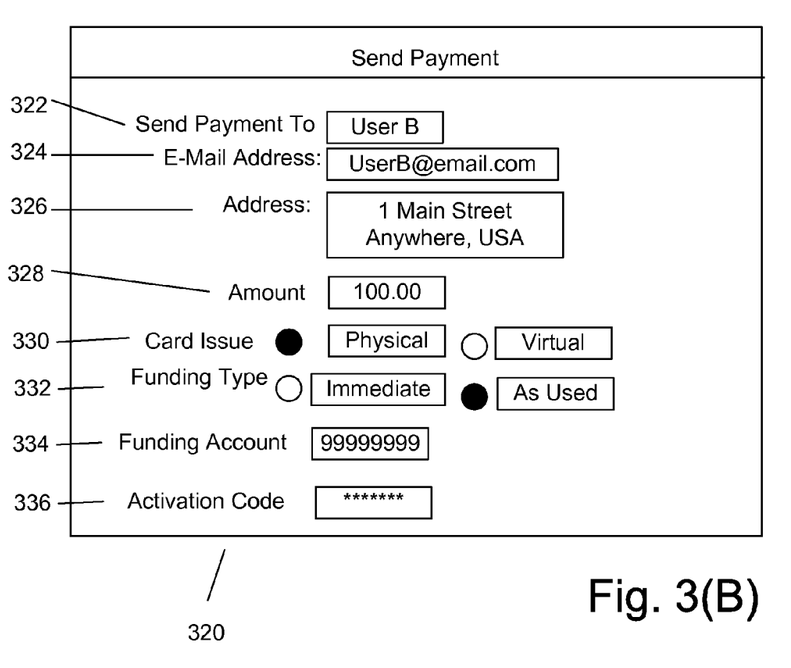

FIG. 3(B) depicts an exemplary screen shot of a send payment screen 320. A Payor can specify contact information for a Payee 322. In some embodiments, the contact information can be an e-mail address 324, while in other embodiments, the contact information can be an address to send physical correspondence 326. The Payor can additionally specify the amount 328 of the payment that should be sent to the Payee. Furthermore, the Payor may specify the type of account identifier 330 that should be sent to the Payee. In some embodiments, a physical transaction card representing the transaction account may be sent to the Payee. In other embodiments, a virtual identifier, such as an account number may be sent to the Payee. The Payor can further specify how the transaction account that is sent to the Payee should be funded 332. In some embodiments, the account may be funded immediately and the full amount of the payment is debited (e.g., withdrawn) from the Payor's account immediately. In other embodiments, the account may be funded by debiting (e.g., withdrawing) funds from the Payor's account as they are used by the Payee. The Payor may additionally specify the transaction account 334 that should be used as the source of funds for the payment. Finally, the Payor may specify an activation code 336 that is necessary to activate the payment.

Figure 3C:
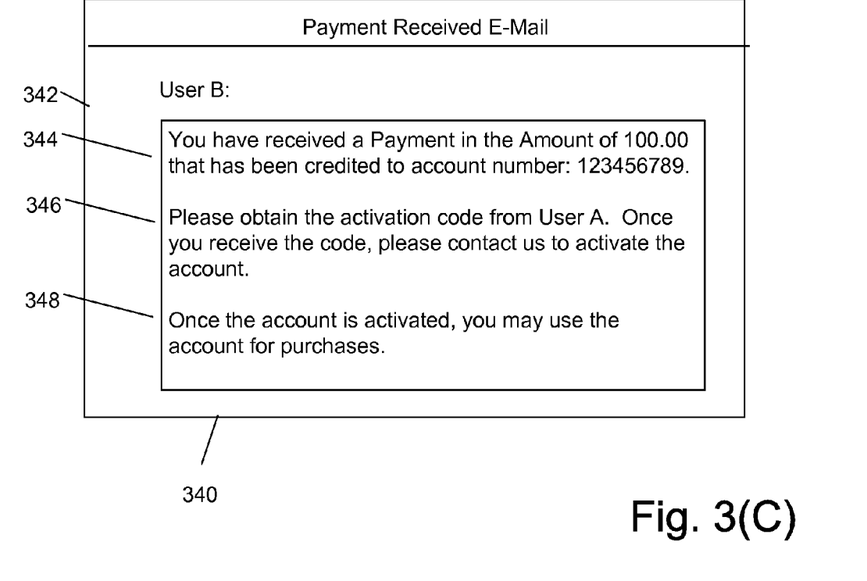

FIG. 3(C) depicts an exemplary screen shot of a payment received e-mail screen 340. An e-mail 342 may be received by the Payee. The e-mail can notify the Payee that he has received a payment for a certain amount and can access the funds by using the specified transaction account identifier 344. The e-mail can further instruct the Payee to obtain the activation code from the Payor 346. Once the activation code has been received from the Payor and the transaction account is activated the transaction account identifier may be used to conduct financial transactions 348.

Figure 3D:
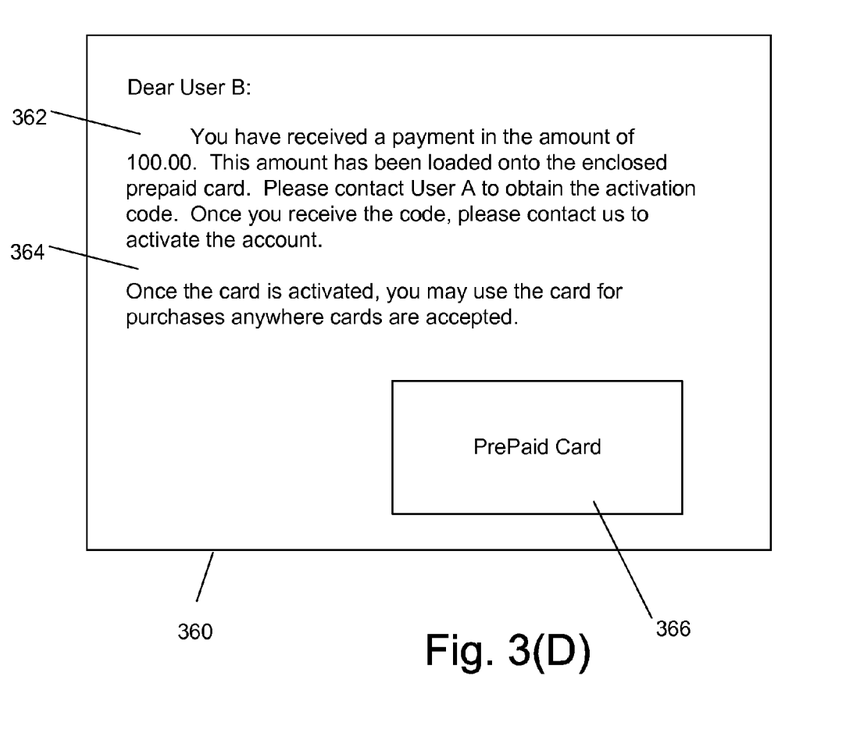

FIG. 3(D) depicts an exemplary letter 360 that may be received by the Payee. The letter can indicate that a payment for a certain amount has been received and can instruct the Payee to contact the Payor to obtain the activation code 362. The letter can further instruct the Payee to contact the payment processing network to activate the transaction account. Once the account is activated, it may be used for purchase transactions 364. In some embodiments, the letter 360 may also include a physical pre-paid transaction card that is not yet activated 366. In other embodiments, the letter can include a transaction account identifier, such as an account number, as described with respect to FIG. 3(C).

III. Exemplary System Elements

Figure 4:
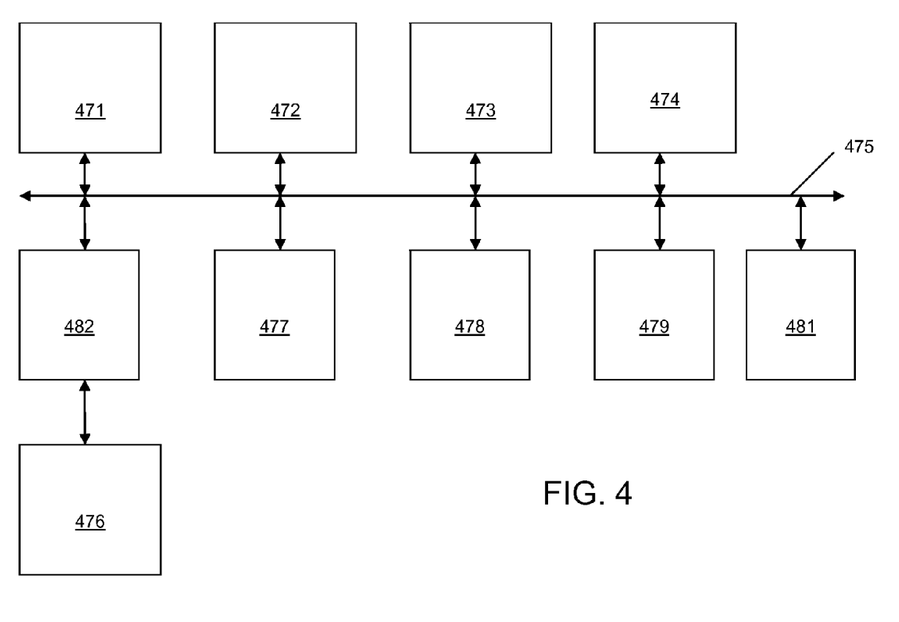
FIG. 4 shows a block diagram of a computer apparatus.

The various participants and elements in FIG. 1 may operate or use one or more computer apparatuses to facilitate the functions described herein. Any of the elements in FIG. 1 (e.g., the access devices 102, 104, the issuer 108, the payment processing network 106, etc.) may use any suitable number of subsystems to facilitate the functions described herein. Examples of such subsystems or components are shown in FIG. 4. The subsystems shown in FIG. 4 are interconnected via a system bus 475. Additional subsystems such as a printer 474, keyboard 478, fixed disk 479 (or other memory comprising computer readable media), monitor 476, which is coupled to display adapter 482, and others are shown. Peripherals and input/output (I/O) devices, which couple to I/O controller 471, can be connected to the computer system by any number of means known in the art, such as serial port 477. For example, serial port 477 or external interface 481 can be used to connect the computer apparatus to a wide area network such as the Internet, a mouse input device, or a scanner. The interconnection via system bus allows the central processor 473 to communicate with each subsystem and to control the execution of instructions from system memory 472 or the fixed disk 479, as well as the exchange of information between subsystems. The system memory 472 and/or the fixed disk 479 may embody a computer readable medium.

In some embodiments, the computer readable medium may contain a program that includes computer code for instructing the processors of the various elements of the present invention to perform the steps presented in the disclosure. In one embodiment the Payor access device 102 may be a computer apparatus as described with respect to FIG. 4. The Payor access device 102 may contain a computer readable medium that contains instructions to direct the Payor access device 102 to perform the methods of the present invention. For example, the computer readable medium may contain computer code that instructs the Payor access device 102 to receive payment transaction information. The payment instructions may be received by the Payor entering information into the Payor access device utilizing one of the input means, such as the keyboard 478. The processor 473 in the Payor access device may store the input received from the Payor in the system memory 472 of the Payor access device. The processor may then follow the instructions stored in the computer readable medium to access the payment instructions from the system memory 472, and reformat the instructions within memory to be in a form suitable for a payment processing network 106. The processor may be further instructed to transmit the reformatted instructions using one of the external interfaces 481 of the Payor access device 102. The external interface 481 may be connected to one or more networks which can allow the Payor access device 102 to communicate with the payment processing network 106.

In some embodiments, an access device may be configured to send payment request information to a payment processing network and may also be configured to send activation code information to a second user. More specifically, it may comprise: a processor; and a computer readable medium coupled to the processor, the computer readable medium comprising: code for sending a payment request to a payment processing network, wherein the request includes contact information for a second user, a first activation code, an amount to transfer, and a first account identifier indicating a first account to be used as the source of the transferred funds wherein the payment processing network is configured to: create a second account having a second account identifier wherein the second account is not initially activated; fund the second account with funds from the first account; send the second account identifier to the second user using the contact information; receive a second activation code from the second user; and activate the second account if the first activation code is the same as the second activation code; and code for communicating the first activation code to the second user.

In another embodiment, the payment processing network can include computer apparatus as described with respect to FIG. 4. The payment processing network 106 may contain one or more computer readable media that contain instructions to direct the payment processing network 106 to perform the methods of the present invention. For example, the computer readable medium may contain instructions to direct one or more processors 473 of the payment processing network 106 to receive payment instructions from a network. The instructions may be received from the network by utilizing one or more external interfaces 481 to the payment processing network 106. The instructions can be received by one or more of the processors 473 of the payment processing network and stored in the system memory 472 of the payment processing network. The computer readable medium can also contain computer code to instruct a processor 473 of the payment processing network to read the payment instructions from the system memory 472 to parse the various elements of the payment instructions. The processor 473 may extract the Payee information, the amount information, the source account information, and any other relevant information, from the payment instructions and store the information in the system memory 472. This information can then be used to generate a pre-paid transaction account.

The payment processing network 106 can further include code instructing a processor 473 of the payment processing network 106 to format a message to be sent to an issuer 108 containing a subset of the previously parsed information that was stored in the system memory 472. The newly formatted message can be stored in the system memory 472. A processor 473 in the payment processing network may read the message formatted for the issuer 108 from the system memory 472, and send the message to an issuer 108 using one of the external interfaces 481 to ensure that sufficient funds are available in the Payor's account. If so, a processor 473 in the payment processing network 106 may create a new pre-paid transaction account by formatting a message in the system memory 472 to be sent to the issuer 108 to instruct the issuer to create a new account. A processor 473 in the payment processing network 106 may further read instructions from the computer readable medium to send an electronic message to the Payee access device 104 by using the external interface 481. This message can contain the account identification information for the newly created account. In other embodiments, a processor 473 in the payment processing network 106 can retrieve the account identification information from the system memory 472 and generate a transaction card 110 and a letter to send to the Payee 104. The payment processing network 106 may generate the card and letter by retrieving account information from the system memory 472 and sending the information to a printer 474, where it can then be sent to the Payee 104.

The payment processing network 106 can further include code embodied in the computer readable medium that instructs a processor 473 of the payment processing network 106 to receive an activation code from the Payee 104. The activation code may be received from the Payee 104 using one of the external interfaces 481, and stored by the processor 473 in the system memory 472. The computer readable medium can further include code to instruct the processor 473 to retrieve the activation code received from the Payee 104 from system memory and compare it to the activation code received from the Payor 102 and stored in the system memory 472. If the processor 473 determines that the activation codes are the same, the processor 473 can create and format a message in system memory 473 to instruct an issuer 108 to activate the account. The message can be retrieved from system memory 472 by the processor 473 and sent to an issuer 108 using one of the external interfaces 481. Upon receipt, the issuer 108 can activate the account.

In some embodiments, the access device may be a portable consumer device. One example of a portable consumer device may be a portable wireless device. The portable wireless device can also function as a debit device, credit device, or stored value device.

Figure 5:
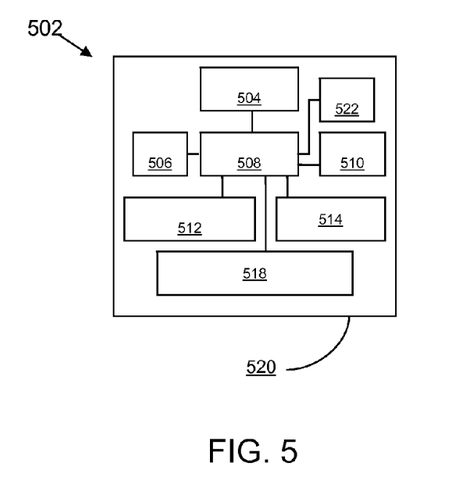
FIG. 5 shows a block diagram of a network access device.

An exemplary portable consumer device 502 in the form of a phone may comprise a computer readable medium and a body as shown in FIG. 5. Portable consumer device 502 may function as an access device. FIG. 5 shows a number of components, and the portable wireless devices according to embodiments of the invention may comprise any suitable combination or subset of such components. The computer readable medium 506 may be present within the body 520, or may be detachable from it. The body 520 may be in the form a plastic substrate, housing, or other structure. The computer readable medium 506 may be a memory that stores data and may be in any suitable form including a magnetic stripe, a memory chip, encryption algorithms, private or private keys, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. The computer readable medium 506 may also contain a program containing code for sending a payment as described above.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable wireless device 502 may further include a contactless element 518, which is typically implemented in the form of a semiconductor chip (or other data storage element) with an associated wireless transfer (e.g., data transmission) element, such as an antenna. Contactless element 518 is associated with (e.g., embedded within) portable consumer device 502 and data or control instructions transmitted via a cellular network may be applied to contactless element 518 by means of a contactless element interface (not shown). The contactless element interface functions to permit the exchange of data and/or control instructions between the mobile device circuitry (and hence the cellular network) and an optional contactless element 518.

Contactless element 518 is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable wireless device 502 and an interrogation device. Thus, the portable wireless device 502 is capable of communicating and transferring data and/or control instructions via both cellular network and near field communications capability.

The portable consumer device 502 may also include a processor 508 (e.g., a microprocessor) for processing the functions of the portable consumer device 502 and a display 510 to allow a consumer to see phone numbers and other information and messages. The portable wireless device 502 may further include input elements 512 to allow a consumer to input information into the device, a speaker 514 to allow the consumer to hear voice communication, music, etc., and a microphone 522 to allow the consumer to transmit her voice through the portable wireless device 502. The portable wireless device 502 may also include an antenna 504 for wireless data transfer (e.g., data transmission).

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Embodiments of the invention contain a number of advantages. A Payor that wishes to send funds to another person or entity may do so without being required to register for a service. The Payor may be able to send a payment to the Payee in the form of a pre-paid transaction account, such that the Payee is assured that the Payor has sufficient funds. The Payor does not completely relinquish control of the Payment because the Payee can not access the funds until the Payor communicates an activation code to the Payee. Furthermore, the Payor is not required to be in full possession of the funds used to make the payment because the Payor may use a credit card to make the payment. Additionally, the payment can be structured such that the funds are not debited (e.g., withdrawn) from the Payor's account until they are actually used by the Payee. This prevents the Payor from being charged the full amount of the payment at the time of the payment. Additionally, embodiments of the present invention have the advantage that the Payee is not required to have a bank account or access to check cashing facilities. Payments can be received by any Payee that has the ability to receive regular postal mail or e-mail. Furthermore, a Payee can be ensured that a Payor has sufficient funds to make a payment, because the pre-paid transaction account would not have been created and sent to the Payee if the Payor did not have sufficient funds or credit available.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A computer-implemented method of transferring funds, performed by a server computer comprising a processor and a non-transitory computer readable medium having computer readable program code embodied therein, said computer readable program code executable by the processor, the method comprising:

receiving, by the server computer, from a first user an authorization request to transfer funds to a second user, wherein the request includes contact information for the second user, an activation code, an amount of funds authorized by the first user to transfer, and a first account identifier indicating a first account to be used as the source of the transferred funds;

creating, by the server computer, a second account having a second account identifier, wherein the second account is not initially activated;

sending, by the server computer, the second account identifier to the second user using the contact information;

receiving, by the server computer, the activation code from the second user;

matching, by the server computer, the activation code sent by the first user with the activation code received from the second user;

activating, by the server computer, the second account, based on the matching;

sending a first notification to an issuer computer, thereby debiting a portion of the amount of funds authorized to transfer from the first account to fund the second account at the time of a first request of the second user to conduct a first transaction using the activated second account, wherein the portion of the amount is less than the amount of funds authorized to transfer; and sending a second notification to the issuer computer thereby debiting any remaining portions of the amount of funds authorized to transfer from the first account to fund the second account up to the amount less the amount of the first transaction, at the time of at least a second request of the second user to conduct at least a second transaction using the activated second account.

2. The method of claim 1 wherein sending the second account identifier to the second user comprises sending a physical token to the second user.

3. The method of claim 2 wherein the physical token is a prepaid card.

4. A non-transitory computer readable medium comprising computer code for performing a method comprising:

receiving, by the server computer, from a first user an authorization request to transfer funds to a second user, wherein the request includes contact information for the second user, an activation code, an amount of funds authorized by the first user to transfer, and a first account identifier indicating a first account to be used as the source of the transferred funds;

creating, by the server computer, a second account having a second account identifier, wherein the second account is not initially activated;

sending, by the server computer, the second account identifier to the second user using the contact information;

receiving, by the server computer, the activation code from the second user;

matching, by the server computer, the activation code sent by the first user with the activation code received from the second user;

activating, by the server computer, the second account, based on the matching;

sending a first notification to an issuer computer, thereby debiting a portion of the amount of funds authorized to transfer from the first account to fund the second account at the time of a first request of the second user to conduct a first transaction using the activated second account, wherein the portion of the amount is less than the amount of funds authorized to transfer; and sending a second notification to the issuer computer thereby debiting any remaining portions of the amount of funds authorized to transfer from the first account to fund the second account up to the amount less the amount of the first transaction, at the time of at least a second request of the second user to conduct at least a second transaction using the activated second account.

5. The computer readable medium of claim 4 wherein sending the second account identifier to the second user comprises sending a physical token to the second user.

6. The computer readable medium of claim 5 wherein the physical token is a prepaid card.

7. A server computer comprising a processor and the computer readable medium of claim 4, wherein the computer readable medium comprises computer code executable by the processor.

8. A method comprising:

sending a payment request to a payment processing network, wherein the request includes contact information for a second user, an activation code, an amount of funds authorized by a first user to transfer to the second user, and a first account identifier indicating a first account to be used as the source of the transferred funds wherein the payment processing network comprises a server computer comprising a processor and a computer readable medium having computer readable program code embodied therein, said computer readable program code executable by the processor to:

create a second account having a second account identifier wherein the second account is not initially activated;

send the second account identifier to the second user using the contact information;

receive the activation code from the second user;

match the activation code sent by the first user with the activation code received from the second user;

activate the second account based on the match;

send a first notification to an issuer computer, thereby debiting a portion of the amount of funds authorized to transfer from the first account to fund the second account at the time of a first request of the second user to conduct a first transaction using the activated second account, wherein the portion of the amount is less than the amount of funds authorized to transfer; and send a second notification to the issuer computer, thereby debiting any remaining portions of the amount of funds authorized to transfer from the first account to fund the second account up to the amount less the amount of the first transaction, at the time of at least a second request of the second user to conduct at least a second transaction using the activated second account; and communicating the activation code to the second user.

9. The method of claim 8 wherein the payment request includes an indication that the second user shall be sent a prepaid card to access the funds.

10. The method of claim 8 wherein the payment request includes an indication that the second user shall be sent an account identifier to access the funds.

11. The method of claim 8 wherein the method is performed by a first user of a first access device.

12. An access device comprising:
a processor; and
a computer readable medium coupled to the processor, the computer readable medium comprising computer readable program code embodied therein, said computer readable program code executable by the processor to implement a method comprising:
sending a payment request to a payment processing network, wherein the request includes contact information for a second user, an activation code, an amount of funds authorized by a first user to transfer to the second user, and a first account identifier indicating a first account to be used as the source of the transferred funds wherein the payment processing network is configured to:
create a second account having a second account identifier wherein the second account is not initially activated;
send the second account identifier to the second user using the contact information;
receive the activation code from the second user;
match the activation code sent by the first user with the activation code received from the second user;
activate the second account based on the match;
send a first notification to an issuer computer, thereby debiting a portion of the amount of funds authorized to transfer from the first account to fund the second account at the time of a first request of the second user to conduct a first transaction using the activated second account, wherein the portion of the amount is less than the amount of funds authorized to transfer; and
send a second notification to the issuer computer, thereby debiting any remaining portions of the amount of funds authorized to transfer from the first account to fund the second account up to the amount less the amount of the first transaction, at the time of at least a second request of the second user to conduct at least a second transaction using the activated second account; and
communicating the first activation code to the second user.

13. The access device of claim 12 wherein the access device is a phone.

14. The method of claim 1 wherein each time the second account is funded, a notification is sent to the issuer of the first account.

15. The method of claim 1, wherein each time the second account is funded, a notification is sent to the issuer of the first account and the issuer responds with an indication that funds have been transferred to the second account.

16. The non-transitory computer readable medium of claim 4, wherein the first account is a credit card account.

17. The method of claim 8, wherein the first account is a credit card account.

18. The method of claim 1, wherein the first account is a credit card account.

19. The method of claim 2, wherein the physical token is gift card.

20. The non-transitory computer readable medium of claim 5, wherein the physical token is a gift card.

21. The method of claim 8 wherein the payment request includes an indication that the second user will be sent a gift card to access the funds.

* * * * *